May 28, 1940.  A. W. TONDREAU  2,202,127
FILM APPARATUS
Filed July 29, 1939  4 Sheets-Sheet 1
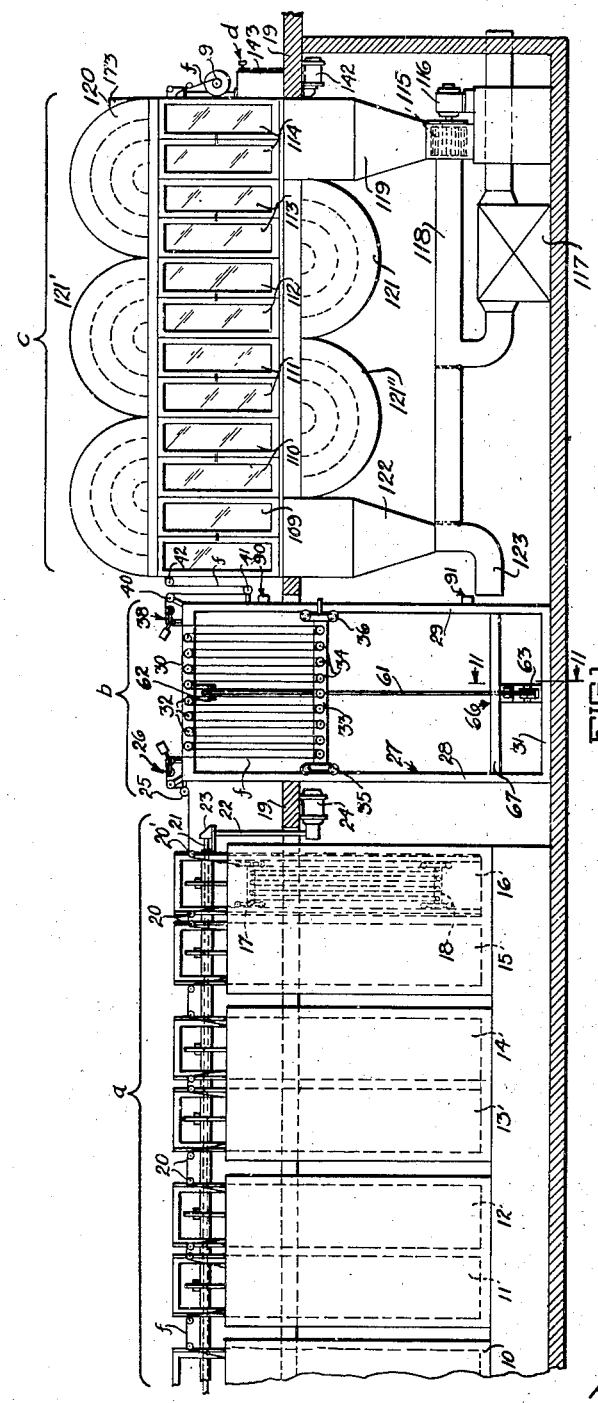
INVENTOR.
ALBERT W. TONDREAU
BY
ATTORNEY

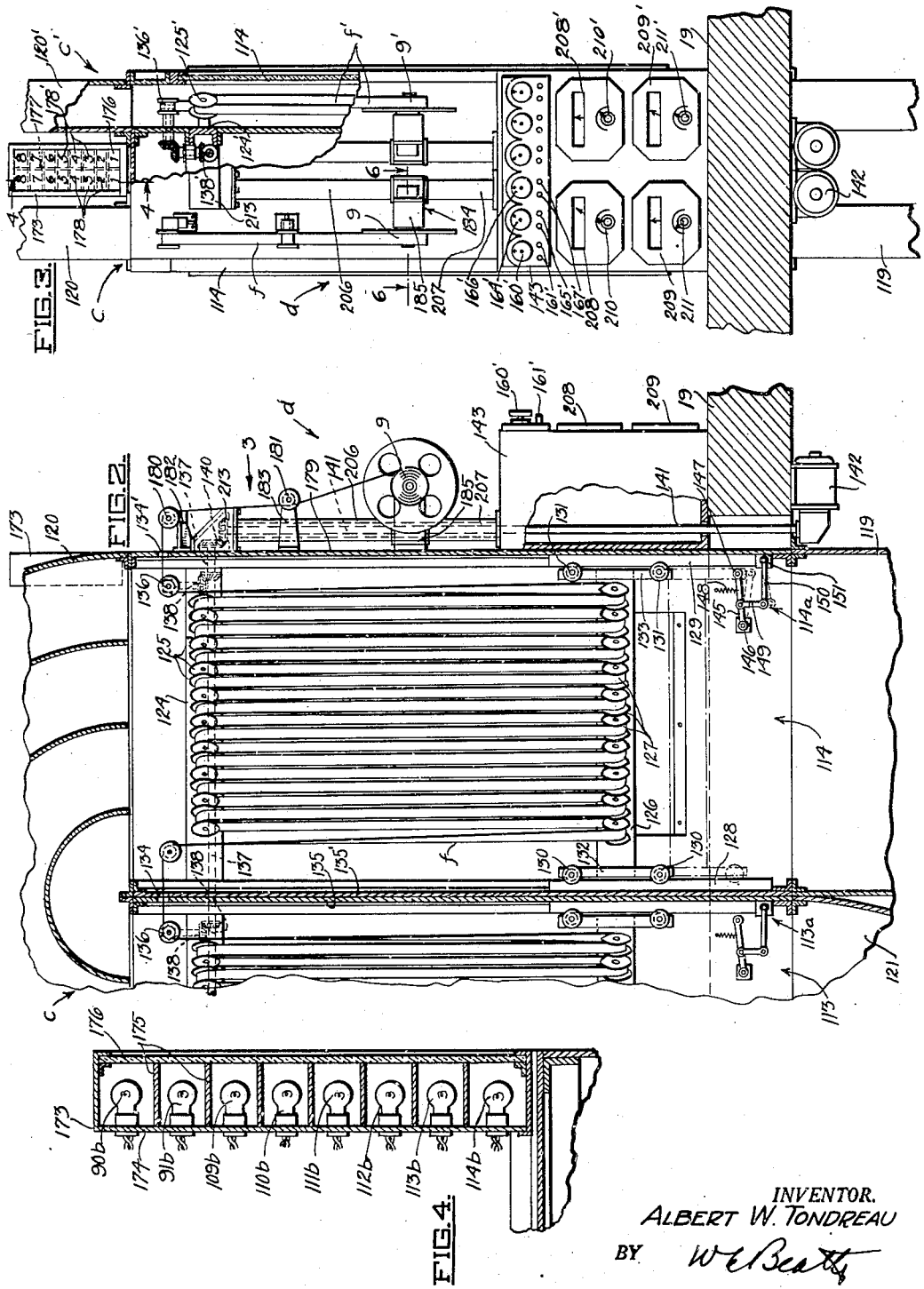

May 28, 1940. A. W. TONDREAU 2,202,127
FILM APPARATUS
Filed July 29, 1938 4 Sheets-Sheet 3
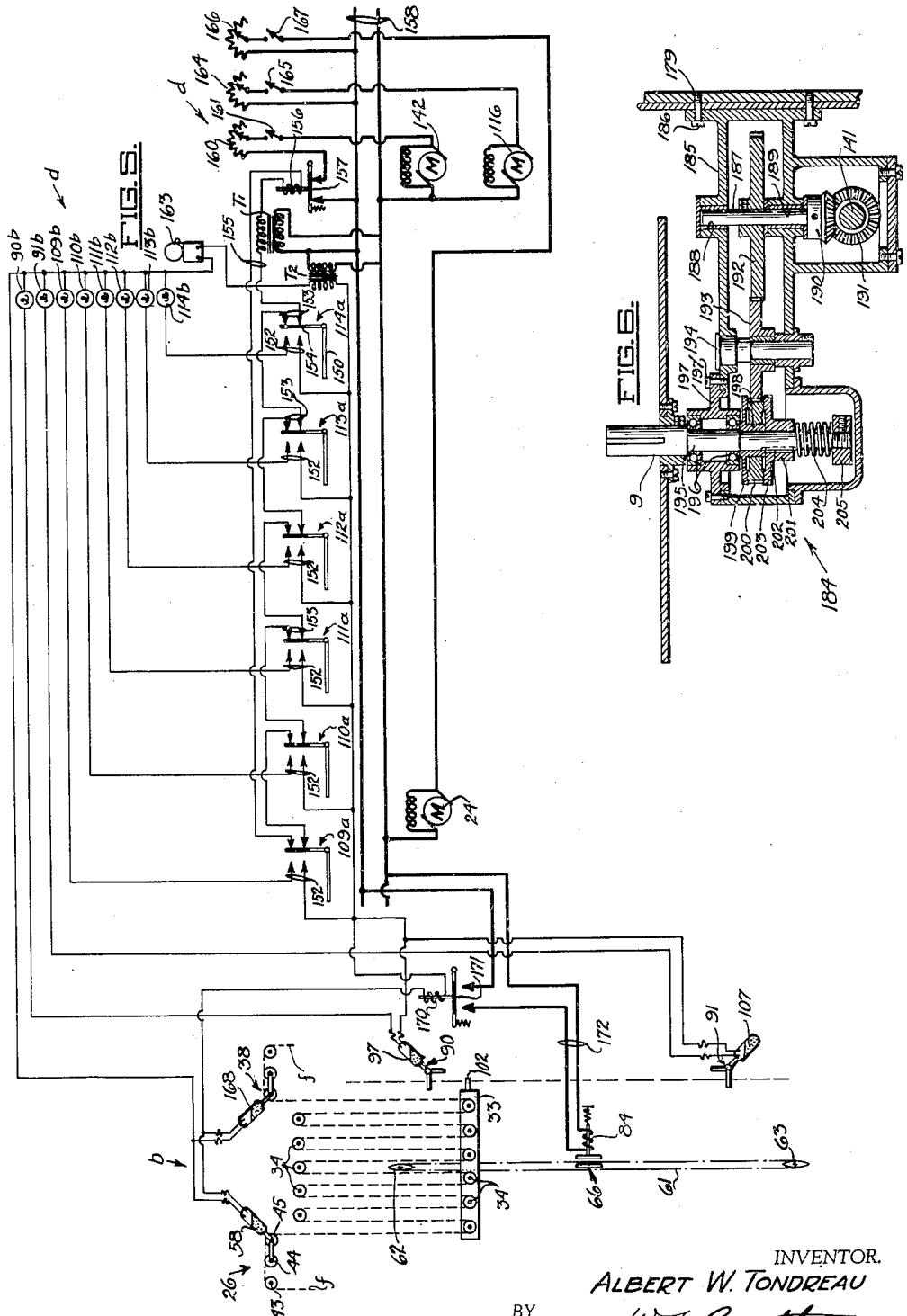
INVENTOR.
ALBERT W. TONDREAU
BY
W. L. Beatty
ATTORNEY.

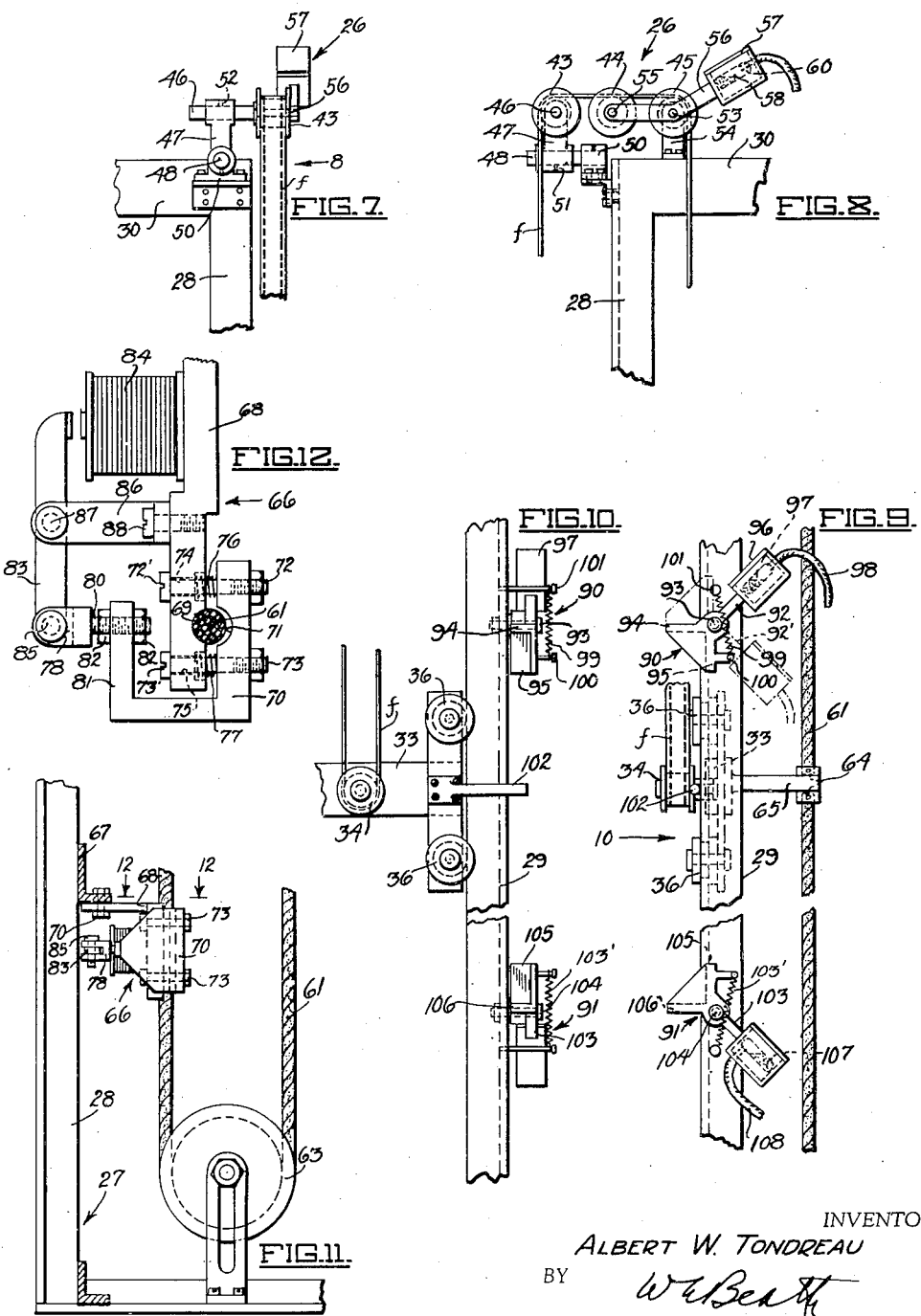

Patented May 28, 1940

2,202,127

UNITED STATES PATENT OFFICE 2,202,127

FILM APPARATUS

Albert W. Tondreau, Glendale, Calif., assignor to Warner Bros. Pictures, Inc., New York, N. Y., a corporation of Delaware Application July 29, 1938, Serial No. 221,955

3 Claims. (Cl. 271—2.3)

This invention relates to apparatus for treating elongated photographic film, such as motion picture film, and has particular reference to means for facilitating the control and supervision of film treating apparatus during the traverse of film therethrough.

After photographic film is exposed in a camera it is treated to render the latent image formed thereon visible and permanent. In modern motion picture film treating apparatus the film is continually passed in succession through various film treating units, each performing a different operation on the film. For example, the film is first passed through a bath of developing solution to render the latent image thereon visible. It is then passed through a bath of fixing solution to render the developed image permanent, thence through a washing solution to wash the various chemicals from the film, thence through a drying apparatus to completely remove the moisture from the film before being stored on reels for future use in motion picture projecting apparatus.

The film, especially during the above mentioned treatment, is very susceptible to breakage, scratching, and other damage. In the continuous treatment of the film, breakage thereof in any one unit will cause an accumulation of the film in that unit with consequent damage to a considerable length of film. Furthermore, breakage of the film in a continuous film treating apparatus causes a tie-up of the whole apparatus and, in certain treating operations, i. e. developing, toning, etc. the stoppage of film therein would cause overdevelopment or overtoning of the film.

One object of the present invention is to indicate at a remote point the condition of a film treating apparatus.

Another object of the present invention is to indicate breakage of film in a film treating apparatus.

Another object of the invention is to automatically control a film treating apparatus in accordance with the condition of film passing therethrough.

Another object of the invention is to stop the operation of a film control mechanism on breakage of the film.

Another object of the invention is to facilitate supervision of a film treating apparatus.

The manner in which the above and other objects of the invention are accomplished will be readily understood on reference to the following specification read in conjunction with the accompanying drawings wherein:

Fig. 1 is a diagrammatic elevational view of a portion of a film treating apparatus embodying the present invention.

Fig. 2 is a sectional elevational view of a portion of the film drying apparatus illustrated in Fig. 1, including the control station.

Fig. 3 is an end view of the film drying apparatus, including the control station, and is taken in the direction of the arrow 3 of Fig. 2.

Fig. 4 is a sectional view of the annunciator panel and is taken along the line 4—4 of Fig. 3.

Fig. 5 is a diagrammatic circuit diagram of the annunciator and control system for the film treating apparatus.

Fig. 6 is a sectional view through the take-up reel drive and is taken along the line 6—6 of Fig. 3.

Fig. 7 is an end view of a film breakage indicator switch.

Fig. 8 is a side view of the film breakage indicator switch shown in Fig. 7 and is taken in the direction of the arrow 8 of that figure.

Fig. 9 is a side view of the film accumulator including the upper and lower limit switches.

Fig. 10 is a front view of the film accumulator including upper and lower limit switches shown in Fig. 9, and is taken in the direction of the arrow 10 of that figure.

Fig. 11 is a sectional view of the lower portion of the film accumulator including the electromagnetic brake and is taken along the line 11—11 of Fig. 1.

Fig. 12 is a detailed plan view of the electromagnetic brake shown in Fig. 11 and is taken along the line 12—12 of that figure.

Referring particularly to Fig. 1 the film *f* after first passing through film developing and fixing solutions (not shown) is passed through a battery of film washing tanks generally indicated at *a*, thence through a film accumulator generally indicated at *b*, and thence through a film drying apparatus generally indicated at *c*. On emerging from the film drying apparatus *c* the film *f* is stored on a take-up reel 9 situated at a control station generally indicated at *d*.

The film washing apparatus *a* comprises a plurality of separate washing tanks 10 to 16, inclusive, through which the film is continually passed. This apparatus may be of conventional construction and therefore it is not deemed necessary to illustrate the same in detail. The film guiding mechanism in each tank may, however, comprise upper and lower spool heads, as shown by the dotted lines 17 and 18, respectively, in the tank 16 over which the film is passed in a plurality of sinuous loops. The film $f$ is passed from one wash tank to the next by driven sprockets 20, situated above each of the tanks 10 to 16, inclusive. The lower spool head 18 is capable of vertical movement under the influence of gravity and is supported entirely by the loops of film $f$ travelling therearound whereby the film is maintained in a taut condition during its traverse through the respective tanks. Each of the sprockets 20 is driven in a suitable manner (not shown) by a horizontal drive shaft 21. Shaft 21 is driven through a gear box 23 and vertical shaft 22 by an electric motor 24. Motor 24 is suitably secured to the under surface of a floor 19.

The film $f$, after passing from the last film driving sprocket 20' of the washing apparatus $a$, is led under a guide spool 25 and thence over a film breakage indicator switch mechanism, generally indicated at 26, mounted on the film accumulator $b$.

Accumulator $b$ comprises a rectangular frame 27, including a pair of spaced vertically extending guide posts or members 28 and 29. Posts 28 and 29 are secured in spaced relation with each other by upper and lower cross beams 30 and 31, respectively. The upper beam 30 forms a stationary spool head on which is rotatably mounted a series of spaced film guiding spools 32. A lower spool head 33 is provided, also having a series of spaced film guiding spools 34 rotatably mounted thereon. Spool head 33 has pairs of guide rollers 35 and 36 rotatably mounted at either end thereof to guide the spool head 33 in a vertical direction along the guide posts 28 and 29.

The film, on leaving the breakage indicator switch mechanism 26, is led in a sinuous path around the various rollers 32 and 34 provided on the upper and lower spool heads 30 and 33, respectively. The film $f$ is thereafter led over a second breakage indicator switch mechanism generally indicated at 38, similar to that of 26, and around guide spools 40, 41 and 42. After the film leaves the spool 42 it is led through the film drying apparatus $c$ in a manner described hereinafter.

While travelling around the various film guiding spools 32 and 34 of the spool heads 30 and 33, respectively, the film is maintained in a taut condition solely by the weight of the lower spool head 33.

Referring to Figs. 7 and 8 in particular, the film breakage indicator switch mechanism 26 comprises three film spools 43, 44 and 45, over which the film is successively guided from the last sprocket 20' of the film washing apparatus $a$ to the first one of the spools 34 on the spool head 33 of the accumulator $b$. Spool 43 is rotatably mounted on a stationary shaft 46 secured within a bore formed in a mount 47. Mount 47 is provided with a second bore whereby it is mounted upon a horizontally extending circular post 48 which is supported by a bracket 50 from the upper beam or spool head 30. The mount 47 is adapted to be adjustably rotated and/or shifted lengthwise along the shaft 48, being removably secured thereto by a suitable set screw 51. Shaft 46 is adapted to be adjustably shifted longitudinally through the mount 47 and is secured therein in any adjusted position by a set screw 52. The provision of the above mentioned adjustable mount 47 permits accurate alignment of the film guiding spool 43 with the remaining two spools 44 and 45. Spool 45 is rotatably mounted on a shaft 53 supported in fixed horizontal position from the beam 30 by a bracket 54. The switch operating spool 44 is rotatably mounted on a shaft 55 secured to the forward end of a switch arm 56. Arm 56 is rotatably journaled intermediate its ends upon shaft 53 of spool 45 and carries at its other end a switch box 57 having secured therein a mercury switch 58 of conventional construction. The weight of the switch box 57 and switch 58 tends to rotate the arm 56 in a clockwise direction, it being held in the position shown in Fig. 8 by the tension of the film $f$ while travelling over the spool 44. In this position of the arm 56 the mercury switch 58 is maintained in an open condition wherein the contact points 60 thereof are out of contact with the mercury within the switch. Whenever tension is released on the film due to breakage thereof, or for any other reason, the arm 56 swings in a clockwise direction to cause the mercury switch 58 to close a circuit connected thereto.

A cable 61 passes around upper and lower pulleys 62 and 63, respectively, (Figs. 1, 5 and 11) and is secured at each end thereof at 64 (Fig. 9) to a bracket 65 extending rearwardly from the lower spool head 33 of the accumulator $b$. Pulleys 62 and 63 are rotatably mounted in fixed positions in any suitable manner at the top and bottom, respectively, of the frame 27, thus permitting the cable 61 to travel with the spool head 33.

A normally de-energized electro-magnetic brake generally indicated at 66 (Figs. 11 and 12) is provided in the path of travel of the cable 61 to arrest the movement of the same whenever energized and thus also arrest the vertical movement of spool head 33. Brake 66 is supported by a cross piece 67 suitably secured at either end thereof to the vertical guide posts 28 and 29 of the accumulator frame 27, and comprises a bracket 68 secured to the cross piece 67 by a bolt 70. Bracket 68 has a semi-circular vertically extending groove 69 formed at the forward end thereof in which the cable 61 is guided. A U-shaped braking element 70 is provided adjacent the forward end of the bracket 68 and also has a semi-circular vertically extending groove 71 formed in one leg thereof in juxtaposition with groove 69 and through which the cable 61 is guided. Pairs of bolts 72 and 73 are threadably secured in the braking element 70 and are slidably mounted within apertures 74 and 75 formed in the bracket 68 whereby the braking element 70 may be guided into and out of frictional braking contact with the cable 61. Compression springs 76 and 77 surrounding the bolts 72 and 73, respectively, are interposed between the bracket 68 and element 70 to resiliently urge the element 70 away from braking contact with the cable 61 when the brake is in a de-energized position, the heads 72' and 73' of the bolts 72 and 73, respectively, serving to limit the outward movement of the braking element 70. A clevis member 78 having a threaded shank 80 extending therefrom is adjustably secured to the leg 81 of member 70 by adjusting nuts 82, threaded on the shank 80 on opposite sides of leg 81. A lever 83, forming on one side thereof an armature for an electro-magnet 84, is pivotally mounted at one end thereof on the clevis 78 by means of a pin 85. Lever 83 is pivotally supported intermediate its ends upon a bracket 86 by means of a pin 87. Bracket 86 is secured on the main bracket 68 by screws 88. Electro-magnet 84 is also suitably secured to the bracket 68 and when energized causes the armature lever 83 to rotate in a clockwise direction, thereby drawing the braking element 70 into frictional contact with the cable 61 to arrest the movement of the cable.

Referring particularly to Figs. 9 and 10, upper and lower limit switch devices generally indicated at 90 and 91, respectively, are provided along the vertical guide post 29 of the film accumulator frame 27 to indicate at the control station d (Fig. 1), in a manner described hereinafter, the movement of the lower spool head 33 of the film accumulator b above and below predetermined limits. The upper limit switch device 90 comprises an arm 92 pivotally mounted by means of a pin 93 on the side of the guide post 29 for movement about a horizontal axis. The forward end of arm 92 has a pair of projections 94 and 95 integrally formed thereon at right angles to each other, one of which is adapted to extend beyond the forward edge of the guide post 29 as shown in Fig. 9. A switch box 96, containing a mercury switch 97 suitably secured therein, is provided on the rear end of the arm 92 and has connected thereto a flexible electrical cable 98 electrically connected in circuit with the contacts of the mercury switch 97. A tension spring 99 is secured at one end thereof to a pin 100 on arm 92 and at the other end to a pin 101 mounted on the guide post 29. Spring 99 serves as a snap-over spring to hold the arm 92 in either of the two positions illustrated by the full lines 92 and the dotted lines 92' of Fig. 9. Arm 92 is actuated by a projection 102 extending laterally from the spool head 33 and adapted to alternately engage the adjacent faces of projections 94 and 95. When the spool head 33 is moved upwardly past the arm 92 the projection 102 engages the horizontally extending projection 94 to swing the arm 92 clockwise into the dotted line position indicated at 92' thus closing the mercury switch 97 to actuate a suitable signal device described hereinafter. Arm 92 will remain in its new position, through the action of spring 99, until the spool head 33 is drawn downward therepast. As the projection 102 engages the projection 95 (now extending horizontally) the arm 92 will be moved counter-clockwise into its original position.

The lower limit switch device 91 is substantially similar to that of 90 and is also adapted to be actuated by the projection 102 of the spool head 33. Switch device 91 comprises an arm 103 pivotally mounted on the guide post 29 by a pin 104 and has a pair of projections 105 and 106 extending therefrom at right angles to each other, either of which is adapted to extend in the path of the projection 102 on spool head 33. A mercury switch 107 is carried by the arm 103 and assumes an open position when the arm 103 is held in the normal illustrated position, as when the spool head 33 is maintained above the projection 106. However, as the projection 102 engages this projection 106, due to a downward movement of the spool head 33 past switch 91, the arm 103 is rotated in a counter-clockwise direction to close the mercury switch 107 and is held there by a snap over spring 103' operating in a manner similar to that of spring 99. A flexible electrical cable 108 is electrically connected to the contacts of the mercury switch 107 to control a signal device at the control station d as described hereinafter.

The film drying apparatus c through which the film passes after leaving the guide spool 42, is disclosed and claimed in the co-pending applications of A. W. Tondreau, S. N. 190,237, filed February 12, 1938, and A. W. Munson, S. N. 93,042, filed July 28, 1936.

As shown in Fig. 1 the drying apparatus c comprises a series of film drying compartments 109 to 114, inclusive. Drying air is passed successively from the last compartment 114 through the various compartments to the first compartment 109 by means of a blower 115 driven by an electric motor 116. Blower 115 draws air from an air conditioning unit, generally indicated at 117 (having the usual heat and moisture control), through a conduit 118, and passes the same upwardly through a flue 119 and thence through the drying compartment 114. A semi-circular duct 120 conveys the air after passing through the compartment 114 downwardly into the next preceding compartment 113. Similar ducts 121, 121', 121'', etc., successively pass the drying air vertically through the various preceding compartments. The drying air on emerging from the first film drying compartment 109 passes downwardly through a flue 122 and may be exhausted through an outlet conduit 123.

As shown in Fig. 2, illustrating in section the last drying compartment 114 and part of the next preceding compartment 113, each of the drying compartments 109 to 114, inclusive, is bounded by four walls to form a narrow vertically elongated passage for drying air therethrough. An upper spool head 124 is suitably secured in a fixed position at the upper end of each drying compartment and has a plurality of horizontally spaced film guiding spools 125 rotatably mounted thereon. A lower spool head 126 also having film guiding spools 127 rotatably mounted thereon is provided at the bottom of each film drying compartment. The lower spool head 126 is movable in a vertical direction being supported entirely by the loops of film f passing around the upper and lower sets of spools 125 and 127, respectively, in a sinuous manner. Spool head 126 is guided along vertical guides 128 and 129 by pairs of guide rollers 130 and 131 rotatably mounted on cross heads 132 and 133, respectively, secured at either end of the spool head 126. The film f is led from one film compartment to the next through a slot 134 provided in the adjacent walls of adjacent compartments as at 135 and 135' of compartments 113 and 114. A film driving sprocket 136 rotatably mounted in each compartment adjacent the slot 134 is provided to drive the film through its respective compartment. The various film driving sprockets 136 are driven by a single horizontally extending drive shaft 137 through suitable gear connections as indicated by the dotted lines 138 to drive the film in a continuous manner through the film drying apparatus c. Drive shaft 137 is operatively connected through a pair of bevel gears 140 to a vertically extending drive shaft 141 connected at the lower end thereof to an electric motor 142 suitably secured to the under surface of the floor 19. Shaft 141 extends through a control panel box 143 resting on the floor 19 and extending from the rear wall 179 of the drying compartment 114.

A limit switch generally indicated at 114a is provided at the bottom of the compartment 114 and is adapted to be actuated by the lower spool head 126 when it drops below a predetermined level due to breakage of the film within compartment 114 or for any other reason. Switch 114a comprises an arm 145, pivotally mounted at 146 to the back wall of the compartment 114. The free end 147 of the arm 145 lies in the path of movement of the cross head 133 of spool head 127 and is adapted on engagement therewith to be moved downwardly into the dotted line position shown. A tension spring 148 secured between the arm 145 and a point on the rear wall of compartment 114 urges the arm 145 into the upper full line position shown and maintains the arm 145 in that position whenever cross head 133 is out of engagement therewith. A link 149 is pivotally secured at one end thereof to the link 145 and at the other end thereof to the free end of a switch arm 150. Arm 150 is pivotally mounted on a switch box 151 and is operatively connected to switch contacts therein.

As shown diagrammatically in Fig. 5 the limit switch 114a (the contacts of which are enclosed in the switch box 151 of Fig. 2) is of the double throw type having two sets of contacts 152 and 153 either of which is adapted to be connected by a contact arm 154, actuated by the switch arm 150 to close respective circuits connected thereto. Similar limit switches generally indicated at 109a, 110a, 111a, 112a and 113a are provided, one for each of the compartments 109 to 113, respectively. In normal operation, that is, when the lower spool heads 126, etc., in the various compartments 109 to 114, inclusive, are out of engagement with the respective limit switches 109a to 114a, inclusive, the contact arms 154 of these switches will be held in engagement with their respective contacts 153. The various contacts 153 are provided in series in a relay control circuit 155. Also included in the circuit 155 is the actuating coil 156 of a relay 157 and the secondary winding of a step-down transformer $T_1$, the primary winding of which is connected across a current supply circuit 158. When the circuit 155 is closed, the relay actuating coil 156 acts to maintain the relay 157 closed. However, on opening of the circuit 155 by means of any one of the limit switches 109a to 114a, the relay 157 will automatically open. The relay 157 is provided in series with a rheostat 160, a switch 161, and the motor 142 for driving the film through the entire firm drying apparatus $c$. Relay 157, rheostat 160, switch 161 and motor 142 are provided in circuit across the current supply circuit 158 to energize motor 142 when the relay 157 and switch 161 are closed.

The normally open contacts 152 of the switch 114a are provided in an alarm circuit comprising, in series, the contacts 152, a signal lamp 114b, an electric alarm bell 163, and the secondary winding of a step down transformer $T_2$, the primary winding of which is connected across the supply circuit 158. Similarly, the limit switches 109a, 110a, 111a, 112a and 113a are connected in circuit with respective signal lamps 109b, 110b, 111b, 112b and 113b, the alarm bell 163 and the secondary winding of transformer $T_2$. These various signal lamps 109b to 114b inclusive, are arranged in a battery and provided in an annunciator panel box described hereinafter. Thus it will be seen that when the lower spool head in any of the compartments 109 to 114, inclusive, drops into engagement with the actuating arm of its respective limit switch, the respective signal lamp will be illuminated and the bell 163 will ring.

The air blower motor 116 is provided in series in a circuit including a rheostat 164 and a switch 165, which circuit is connected across the current supply circuit 158.

The motor 24 for driving the film $f$ through the washing apparatus $a$ is connected in a circuit comprising, in series, a rheostat 166 and a switch 167, which circuit is also connected across the current supply circuit 158.

The mercury switch 107 of the lower limit switch device 91 on the accumulator $b$ is provided in a circuit comprising, in series, a signal lamp 91b, bell 163, and the secondary winding of transformer $T_2$ to give an indication when the lower spool head 33 of the accumulator $b$ drops below the level of the limit switch 91. The mercury switch 97 of the upper limit switch device 90 is similarly connected in series with a signal lamp 90b, bell 163, and the secondary winding of the transformer $T_2$ to give an indication when the spool head 33 is elevated above the limit switch 90.

A film accumulator (not shown) similar to that of $b$, may be provided in advance of the film washing apparatus $a$ to store the film $f$ emerging from the developing and treating tanks (not shown) when for any reason the film in the washing tanks $a$ is stopped. In this event upper and lower limit switch devices, similar to those of 90 and 91, may be provided and be connected in circuits similar to those including the switch devices 90 and 91. Signal lamps indicating the conditions of those circuits controlled by such limit switches may be provided in the battery of signal lamps at the control station $d$.

The normally open mercury switches 58 and 168 of the film breakage indicator switch devices 26 and 38, respectively, are connected in parallel with each other and in a circuit comprising, in series, the bell 163, the secondary winding of transformer $T_2$, and the actuating coil 170 of a normally open relay 171. A signal lamp (not shown) may also be provided in this circuit. On breakage of film $f$ intermediate the drive sprocket 20' and the film guiding spool 42, either or both of the normally open mercury switches 58 and 168 will be rotated as hereinbefore described into a closed position to close the circuit connected thereto, thereby actuating the bell 163 and closing the relay 171. The contacts of relay 171 are provided in series in a brake circuit 172, including the actuating coil 84 of the electro-magnetic brake 66. Circuit 172 is connected across the current supply circuit 158 to energize the brake 66 when the relay 171 is closed thus arresting the downward movement of the spool head 33 when either or both of the switches 58 and 168 is closed.

As noted particularly in Fig. 3, the film treating apparatus is provided in duplicate, each apparatus being operable independently of the other and both being situated in back to back relation with each other. As shown, the film drying apparatus $c$ of the treating apparatus disclosed and the duplicate drying apparatus $c'$ are integrally connected together forming a single unit. The control station $d$ serves both of the duplicate apparatuses and has duplicate sets of controls and indicators for this purpose.

Included in the control station $d$ is an annunciator panel box 173 housing on one side thereof the various signal lamps 90b, 91b, 109b, 110b, 111b, 112b, 113b and 114b (Fig. 4). These various lamps are mounted in sockets provided on the rear wall 174 of the annunciator box 173. Horizontal partitions 175 intermediate adjacent lamps form a separate compartment for each lamp. An opal glass panel 176 is provided at the front of the annunciator box 173 and is adapted to be illuminated by the various lamps in the box. A series of identifying numerals 178 are provided along the panel 176. Each of the numerals 176 is opposite a lamp compartment to identify, when illuminated, the lamp illuminating the same and thereby indicate the compartment or part of the film treating apparatus wherein the film has broken or wherein an abnormal condition of the film treating apparatus exists. A vertically extending partition 177 (Fig. 3) is provided through the center of the annunciator box 173 to form duplicate light compartments on either side thereof. The duplicate compartments, similar to those shown in Fig. 4, are provided to illuminate numerals 178', similar to those of 178, serving to identify the lamps within such compartments with the respective switches controlling the same. Annunciator box 173 is situated at the top of film drying compartment 114 and duplicate compartment 114' intermediate the semi-circular ducts 120 and 120' for the compartments 114 and 114', respectively. The box 173 is thus within convenient view of an operator stationed at the control station $d$.

Also included in the control station $d$ are the take-up reels 9 and 9' for receiving the film $f$ and $f'$ from the duplicate film treating apparatuses. After the film $f$ emerges through a notch 134' in the rear wall 179 of the drying apparatus $c$ it is led over film guiding spools 180 and 181 rotatably supported on brackets 182 and 183, respectively, mounted on the wall 179 and is thence fed onto reel 9. Reel 9 is located at a convenient height and within reach of the operator stationed at control station $d$ and is driven by the vertical drive shaft 141 through a take-up reel drive generally indicated at 184 (Fig. 6).

Take-up drive 184 comprises a housing 185 secured at the base thereof to the wall 179 of compartment 114 by screws 186. A shaft 187, journalled in bearings 188 and 189 formed in the housing 185, has secured at one end thereof a bevel gear 190 meshing with a similar bevel gear 191 secured on the vertical drive shaft 141. A spur gear 192 also secured on the shaft 187 within the housing 185 meshes with an idler gear 193 journaled upon a stub shaft 194. Shaft 194 is securely mounted within the housing 185. The take-up reel shaft 195 is journalled within bearings 196 provided in a cover plate 197. Plate 197 is secured to the side of the housing 185 by bolts 197' to cover an enlarged aperture formed in housing 185. A clutch member 198 is securely mounted on shaft 195 and has a flange 199 thereon forming a clutch face. A spur gear 200 rotatably journalled on the clutch member 198 is adapted to be moved into frictional engagement, at one side thereof, with the clutch face on the flange 199. A clutch disc member 201 is slidably keyed at 202 to the shaft 195 and has a flange 203 thereon forming a clutch face adapted to be frictionally engaged with the opposite side of gear 200. A compression spring 204 interposed between a nut 205 on the threaded end of shaft 195 and the disc member 201 is provided to resiliently urge the member 201 into frictional contact with the gear 200 and thus form a frictional non-positive drive for the take-up reel 9.

Referring to Figs. 2 and 3 tubular columns 206 and 207 enclose the vertical drive shaft 141 above and below the take-up drive housing 185. Column 207 is suitably secured at the lower end thereof to the top of the control box 143 and at the top thereof to the bottom of the housing 185, thus aiding in supporting the housing 185 as well as protecting shaft 141. Column 206 also aids in supporting the housing 185, being secured at the top thereof to a housing 213 for gears 140 and at the bottom thereof to the top of housing 185.

Also included in the control station $d$ is the control panel box 143. Box 143 has provided thereon a wet bulb thermometer 208 and a dry bulb thermometer 209 for the purpose of indicating the condition of the air passing through the film drying apparatus $c$. Controls 210 and 211 adjacent the thermometers 208 and 209 respectively, are provided. These controls are remotely connected to the air conditioning unit 117 in a manner not shown to control the condition of the air as desired in view of the readings on the thermometers 208 and 209 or in view of the inspection of the film by the operator as it leaves the drying apparatus $c$. Similar thermometers 208' and 209' and controls 210' and 211', respectively therefor are provided on the control box 143 for the film drying apparatus $c'$.

Control handles 160', 164' and 166' (Fig. 3) for the rheostats 160, 164 and 166, respectively, (Fig. 5) are also provided at the top of the control box 143 whereby the speeds of the motors 24, 116 and 142, respectively, may be independently controlled by the operator while stationed at control station $d$. Suitable shaft connections (not shown) are provided between the control handles 160', 164' and 166', and their respective rheostats 160, 164 and 166. Sets of push buttons 161', 165' and 167' (Fig. 3) operatively connected to the switches 161, 165 and 167 (Fig. 5), respectively, in a manner not shown, are provided directly below the control handles 160', 164', and 166', respectively, to permit the operator to manually stop or start any one of the motors 24, 116, and 142. Similar rheosat control handles and push buttons are provided for the motors of the duplicate apparatus including the drying apparatus $c'$.

The operation of the apparatus disclosed is as follows. Assuming that the film has been properly threaded throughout the various developing and fixing machines (not shown) as well as the washing apparatus $a$, the accumulator $b$ and the drying apparatus $c$, the film as it is progressed forward in a continuous manner by the motors 24 and 142 is rolled up on the take-up reel 9 in the usual manner. The operator during this time is stationed at the control station $d$ to watch the various instruments including the annunciator panel 176 and the thermometers located on the control box 143 as well as the reels 9 and 9'. When the take-up reel 9 has reached its largest permissible diameter the operator opens the switch 161 by pressing one of the push buttons 161' to stop the motor 142 and consequently the film drive through the film drying compartment $c$ while he substitutes an empty take-up reel for the take-up reel 9. During the interval in which take-up reels are being substituted, or at any other time when the motor 142 is stopped, the film $f$, emerging from the washing apparatus $a$ is stored or accumulated on the accumulator $b$. The spool head 33 of accumulator $b$ at this time lowers under the action of gravity to accommodate the greater length of film on the accumulator. In the event that the lower spool head 33 drops past the switch 91 the lamp 91b will be illuminated and the bell 163 will be rung to indicate to the operator that the spool head 33 is about to reach its lowermost position. Thereafter, if the operator is not yet in a position to reel the film on a take-up reel, he has recourse to either of two steps; first, he may stop the film drive through the washing apparatus $a$ by stopping the motor 24 by means of the switch 167, controlled by the buttons 167', thereby allowing the accumulator (not shown) in advance of the washing apparatus $a$ to store the film thereon which emerges from the developing and fixing tanks (not shown); second, he may allow film ($f$) to pile up on the floor or in a suitable basket adjacent the control station $d$ until the same can be reeled onto a take-up reel 9.

In the event that the film $f$ breaks in any one of the compartments 109 to 114, inclusive, the lower spool head in that compartment will actuate the respective one of the limit switches 109a to 114a, inclusive, to open the relay circuit 155 (Fig. 5). When circuit 155 is opened the motor driving the film $f$ through the drying apparatus $c$ stops and simultaneously the respective signal lamp and the bell 163 indicates to the operator that the film is broken and also identifies the particular compartment wherein such film breakage has occurred.

Thus it will be seen that the operator will be immediately notified of the exact point of film breakage whereby such breakage may be normally mended in time to permit the film drive through the drying apparatus $c$ to continue before the film accumulator $b$ has reached its full capacity.

Whenever the motor 142 has been stopped for any length of time, the operator may increase the speed of the motor by manipulating the rheostat 160, thus increasing the speed of the film through the drying apparatus $c$ relative to the speed thereof through the film washing apparatus $a$ to reduce the amount of film in the accumulator $b$ to normal operating capacity.

Whenever the film breaks in the accumulator $b$ the operator will be immediately notified thereof through the intermediary of the bell 163 actuated by either or both of the switch mechanisms 26 and 38 (Figs. 1 and 5). Simultaneously, the relay 171 will be closed to energize the electromagnetic brake 66, thus preventing the spool head 33 of accumulator $b$ from dropping to the bottom of the guide frame 27 and also obviating the necessity of re-threading the film over the entire sets of rollers 32 and 34 such as would result if the spool head 33 were to drop after the film passing thereover breaks.

If on inspecting the film $f$ as it leaves the drying apparatus $c$ the film is found to be imperfectly dried, the operator may manipulate the controls 210 and/or 211 (Fig. 3) to change the condition of the air, and/or he may manipulate the rheostat handle 164' of rheostat 164 to change the speed of the blower motor 116, thus changing the speed of the drying air through the drying apparatus $c$.

While I have described the invention in its preferred embodiment, I desire it to be understood that modifications may be made and that no limitations upon the invention are intended than are imposed by the scope of the appended claims.

I claim:

1. Film apparatus comprising the combination of upper and lower sets of film spools adapted to guide an elongated film therearound, means rotatably supporting said upper set of spools in fixed position, a vertically movable spool head, means rotatably mounting said lower set of spools on said spool head whereby said lower set of spools and said spool head are supported by said film to maintain said film under tension, a normally inoperative electro-magnetic brake adapted to arrest the vertical movement of said spool head, an electric circuit for said brake, a movable element in engagement with said tensioned film, said element being adapted to move beyond a predetermined point when the tension in said film is released, and means operable in response to the movement of said element beyond said predetermined point for closing said circuit.

2. Film apparatus comprising upper and lower sets of film spools adapted to guide an elongated film therearound, means rotatably supporting said upper set of spools in fixed position, a vertically movable spool head, means rotatably mounting said lower set of spools on said spool head whereby said lower set of spools and said spool head are supported by said film, a normally de-energized brake, a cable movable through said brake and secured to said spool head, and means responsive to the breakage of said film for energizing said brake to clamp said cable and arrest the vertical movement of said spool head.

3. Film apparatus comprising upper and lower sets of film spools adapted to guide an elongated film therearound, means rotatably supporting said upper set of spools in fixed relation, a vertically movable member, means rotatably mounting said lower set of spools on said member whereby said lower set of spools and said member are supported by said film, a normally de-energized brake, a pair of upper and lower pulleys, means rotatably mounting said pulleys in fixed position, a cable passing around said pulleys and secured at either end thereof to said member, said cable passing through said brake, and means responsive to breakage of said film for energizing said brake to clamp said cable and arrest the vertical movement of said member.

ALBERT W. TONDREAU.